March 20, 1962

D. H. DE MOTT 3,026,473

FREQUENCY RESPONSE ANALYZER

Filed Oct. 9, 1959

INVENTOR.
DALE H. DE MOTT
BY
Attorneys

March 20, 1962  D. H. DE MOTT  3,026,473
FREQUENCY RESPONSE ANALYZER
Filed Oct. 9, 1959  2 Sheets-Sheet 2

INVENTOR.
DALE H. DE MOTT
BY Fulwider Mattingly & Huntley
Attorneys

United States Patent Office 3,026,473
Patented Mar. 20, 1962

3,026,473
FREQUENCY RESPONSE ANALYZER
Dale H. De Mott, La Habra Heights, Calif., assignor to Metrolog Corporation, Pasadena, Calif., a corporation of Delaware
Filed Oct. 9, 1959, Ser. No. 845,374
5 Claims. (Cl. 324—57)

This invention relates to apparatus for measuring electrical characteristics, and more particularly to a unique method and apparatus for measuring the frequency response of any portion of an electrical system and deriving information regarding the transfer functions thereof.

In the development of an electrical system or network, the normal procedure is for the design engineer to design the system layout and mathematically compute the transfer functions for the system and for the individual networks employed therein. The items of interest may be one or more of the following: the frequency of operation, the shift in phase of a signal as it passes through a system or network thereof, and the gain of the system or particular network. Normally, the gain is calculated in terms of the ratio of the amplitudes of a signal at the output and input of the network or networks under test. The phase shift is computed in degrees. And the frequency calculations are generally made on the basis of a logarithmic (log) scale.

After the design is completed, a "breadboard" model is built up of components and networks intended to present the same characteristics as per the design. The transfer functions of the breadboard versions of the networks of the system must then be measured. As is usual, several changes must be made in the breadboard networks, with measurements being taken after each change, until the transfer functions of these networks match reasonably well with the mathematically computed transfer functions.

After the "breadboard" model has been checked out, and changes made therein until it is satisfactory, the stage is set for preparing for production of the system. Initially, one or more "pilot" models or prototypes, are built as nearly as possible to specifications for production line models. Here also, a number of measurements and changes must be made until the transfer functions of the prototypes are proper. After the prototypes have been made to operate successfully, production line drawings are revised accordingly and finalized.

Although items of electrical equipment made on the assembly line are built in accordance with finalized production drawings, it is still desirable to measure the transfer functions of each network as it is completed, in order to locate defective parts and correct the source of the trouble.

In spite of the numerous measurements that must be made, there is at present no satisfactory means for quickly ascertaining the transfer functions of many types of electrical apparatus. This is particularly true in connection with electrical apparatus adapted to operate at extremely low frequencies, i.e., frequencies in the neighborhood of zero frequency or at zero frequency. Examples of such apparatus are servo systems. In servo systems, the problem of ascertaining transfer functions of the system and individual networks therein is all the more acute because, in this type of system, it is generally desirable to know all of the aforementioned functions for each and every network in the system.

However, in checking the transfer functions of servo systems and the like, wherein low frequency signals must be dealt with, an inordinate length of time has heretofore been required in order to obtain an indication of any transfer function. For example, assuming that a signal to be dealt with is one at a frequency of one-half cycle per second, if ten cycles of such a signal may be required to develop a reliable indication of a particular frequency response characteristic, it will be seen that twenty seconds would elapse before a reliable indication would be obtained. Obviously, the great length of time required to check out equipment having a low frequency response characteristic will be seen to militate against quantity production of such equipment.

To understand why the prior art type of transfer function analyzer constitutes such a bottleneck, it must be remembered that the design engineer must often plot the mathematical computations of the transfer functions on charts. For example, he may employ the so-called Bode plot, which illustrates respective curves of the changes in amplitude ratio and phase shift at different signal frequencies.

With presently known analyzers, the resolution of such functions to chart form is an extremely costly and time-consuming process. For one thing, proper operation of the analyzer requires the services of one who is trained for waveform analysis, the taking of null measurements and interpretation of meter readings. For each frequency at which measurements are taken, the amplitude ratio is calculated from amplitude readings, and the amplitude ratio and readings of phase difference are tabulated. Thereafter, the plot is made up from the tabulated test data. After the plot is completed, it is compared with the mathematical analysis previously made by the design engineer. Thus, not only do prior art analyzers require the services of a specialist, but the tasks involved in taking readings and making plots necessitates the use of his services for undesirably long periods of time, all of which contributed measurably to the overall cost of the equipment produced.

Regardless of the frequency of signals from which data of different frequency response characteristics is to be obtained, many prior art function analyzers are characterized by the inclusion of considerable complex and expensive filter circuit arrangements for minimizing distortion. For example, a common problem in prior art analyzers, whether they are designed for operation with D.-C. signals or very high frequency signals (e.g. 100 kilocycles per second), is the distortion that arises in the networks designed to measure phase shift.

Many phase discriminators, for producing an output voltage corresponding to the phase difference between the input voltages, utilize so-called squaring networks. These networks respond to a periodic smooth voltage waveform, e.g., a sinusoid, to amplify and clip the peaks thereof. This results in output voltages from the squaring networks of square waveform, i.e., with substantially vertical trailing and leading edges, and wherein the peak values are the same. By an electronic subtractive process, there is developed a resultant voltage that represents the phase between the square wave voltages, and hence the phase between the input voltages to the squaring networks.

Unfortunately, the input voltages to such squaring networks often are not truly sinusoidal, but contain harmonics. Such harmonics (e.g. "noise") result in the square wave voltages being shifted in phase relative to the input voltages. This phase shifts differs for the respective input voltages and the square wave developed therefrom, so that the output voltage ultimately obtained does not truly represent the phase difference between the input voltages.

The conventional approach is to take steps to prevent the harmonics from entering the phase discriminator. To this end, filter networks are employed in a complex arrangement to filter out the objectionable harmonics. The more elaborate is the arrangement of filters, the more accurately can the actual phase difference between the two input voltages thereto be measured. Necessarily, this procedure adds considerably to the cost of an analyzer. Further, due to the more complex circuitry, such apparatus requires frequent checking, and hence adds to the maintenance costs thereof.

It is an object of this invention to provide an improved method and means for electrically measuring various frequency response characteristics of a device.

It is another object of this invention to provide unique means for analyzing the frequency response of a device and automatically measuring and computing various characteristics to provide indications of the transfer functions thereof.

A further object of this invention is to provide analyzer apparatus for electrical networks characterized by low frequency operation, and which provides accurate measurement of transfer functions of such networks at lower frequencies than is possible with prior art analyzers.

It is a further object of this invention to provide analyzing means for an electrical network, wherein accurate indications of various transfer functions are obtained in less than a single cycle of variation of a test signal.

Yet another object of this invention is to provide a unique servo analyzer with which a record of measurements can be recorded automatically, thereby eliminating the need for specialists required for operation of prior art servo analyzers.

A still further object of this invention is to provide a frequency response analyzer wherein the effects of harmonic distortion are rejected.

The above and other objects and advantages of this invention will become apparent from the following description taken in conjunction with the accompanying drawings of an illustrative embodiment thereof, in which.

Figure 1:
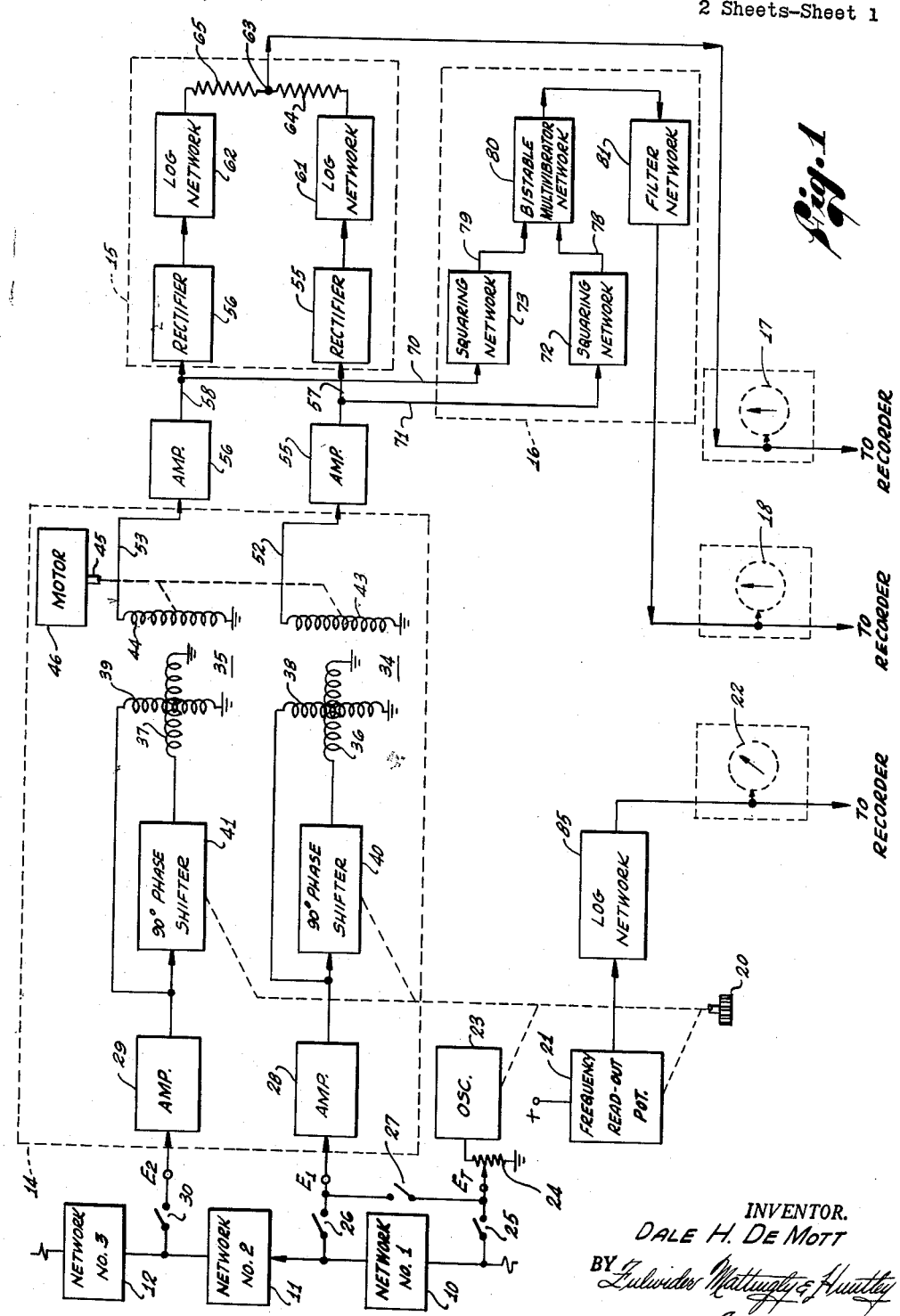
FIGURE 1 is a combined block and schematic diagram of my frequency response analyzer, showing a frequency adding network for developing voltages to be utilized by respective amplitude ratio and phase computers, and showing means for providing indications simultaneously of the frequency, amplitude ratio, and phase shift functions of a network under test.

Referring to FIGURE 1, there is shown a plurality of networks 10, 11, 12 representing a portion of a system to be analyzed. A frequency adding network 14 is provided to which are fed input and output signals from the portion of the system to be analyzed. The frequency adding network 14 functions to convert each of the input and output signal voltages in respective channels to an output voltage that is proportional in amplitude but higher in frequency, and such output voltages have the same phase relationship as the input and output signal voltages.

The output voltages from the frequency adding network 14 are applied to respective channels in each of an amplitude ratio computer network 15 and a phase shift computer 16. The amplitude ratio computer 15 develops a D.-C. voltage corresponding to the ratio, in terms of a db (decibel) scale, of the output signal voltage to the input signal voltage, such D.-C. voltage being utilized to actuate a meter 17 and provide a directly observable indication of the amplitude ratio. Simultaneously such D.-C. voltage is applicable to a recorder (not shown) for making a permanent record or plot of that transfer function.

The phase shift computer develops a D.-C. voltage which corresponds to the difference in phase between the voltages at the input and output of the network under test, and such D.-C. voltage is utilized to actuate a meter 18 for providing a directly observable indication of the phase shift of the test signal as it passes through the network. Simultaneously, such D.-C. voltage is applicable to the aforementioned recorder for making a permanent record of this frequency response characteristic.

Coincidentally with the development of the D.-C. voltages representing the amplitude ratio and phase shift, there is developed a signal which corresponds to the frequency of the test signal. This is accomplished by means of a control knob 20 operating through a voltage pick-off device, such as a potentiometer 21, to develop a D.-C. signal for actuating a meter 22. Simultaneously, the D.-C. voltage representing frequency is made available for use in conjunction with the voltages of the outputs of the amplitude ratio and phase shift computers for properly operating the recording mechanisms used in making the permanent records, e.g. Bode Plots, Nichols Charts, Nyquist Diagrams.

In this latter connection, it will be noted that for certain types of permanent records, such as rectangular plots wherein amplitude ratio and phase functions are plotted against frequency, it is necessary to provide a writing unit for the amplitude ratio and phase response, and to utilize the D.-C. voltage that represents frequency, or the logarithm of frequency, to position such unit at the proper positions relative to the frequency reference line. In making permanent records which do not use frequency as a reference, e.g., polar plots such as employed in the so-called Nyquist Diagram, it is necessary only to activate writing units in response to the D.-C. voltages representing amplitude ratio and phase shift.

It is, of course, desirable to apply a signal to the input of the network to be analyzed which is of a known frequency. Accordingly, an oscillator 23 is employed to develop a signal, $E_t$, as a test signal. The test signal, $E_t$, is picked off a potentiometer 24 in the output circuit of the oscillator 23, such potentiometer being provided to permit the amplitude of the test signal applied to the network under test to be controlled selectively.

It will, of course, be recognized that prior art servo analyzers have employed sources of known frequency as the test voltage signals for devices under test to determine the transfer functions thereof. However, my invention is unique in that it does not require, as do prior art servo analyzers, that the test signal be applied directly to the network under test. In other words, my analyzer works equally well whether the test signal is applied directly to the input of the device or network under test, or whether the test signal reaches the network under test through another network. This is accomplished by reason of the fact that my system automatically measures the frequency response of the network under test, without regard to any particular characteristics of the test signal; all that is required is that the frequency of the test signal be known.

In FIGURE 1, switch and lead connections are illustrated for operation to permit one network 11 to be analyzed, either for applying test signal voltage directly to the input of the network 11, or to the network 10 through which the test signal reaches the input of the network 11. A switch 25 is connected between the potentiometer 24 and the input of the network 10, and a pair of switches 26, 27 are respectively connected between the potentiometer 24 and the input of the network 11. To apply the test signal, $E_t$, directly to the network 11, the switches 26, 27 are closed and the switch 25 remains open. When the switches 25, 26 are closed and the switch 27 is open, the test signal is applied directly to the network 10. In this latter case, the signal appearing at the input of the network 11 may be shifted in phase with respect to, and have a different magnitude, than the test signal, $E_t$, depending upon the characteristics of the network 10.

The input and output connections of the network 11 under test are adapted for connection to respective amplifiers 28, 29, the inputs to which are labeled $E_1$, $E_2$. As shown, a switch 30 is connected between the output of the network 11 and the input of the amplifier 29. The symbols $E_1$, $E_2$, also represent the respective input and output signals of the network 11; thus, it will be recognized that the voltage at the input of the network 11, $E_1$, is the test signal voltage $E_t$, reaching the network 11 directly or through the network 10.

The frequency adding network 14 has the ability to algebraically add a frequency to the frequency of each of the voltages, $E_1$ and $E_2$, and to do this directly without developing voltages of any other frequency. In other words, the frequency adding network 14 functions as a single sideband suppressed carrier modulator to provide, without filtering, voltages which are solely the sums of the frequencies of the respective voltages $E_1$ and $E_2$ with the carriers. Although such addition may be effected electronically, I prefer to do it electromechanically in the manner illustrated in FIGURE 1.

To effect frequency addition in the preferred manner, I utilize a pair of resolvers or synchro devices 34, 35 having pairs of stator windings 36—37, 38—39 in which the windings are at right angles to each other. The resolvers 34, 35 have respective stator windings 38, 39 connected directly to the amplifiers 28, 29, and the remaining stator windings 36, 37 are connected to the amplifiers 28, 29 through respective phase shifting networks 40, 41, which shift the signals therethrough by 90°. By thus applying voltages 90° out of phase to the stator windings of the resolvers, rotating flux vectors are established which have lengths corresponding to the magnitudes of the signals $E_1$, $E_2$. The direction of rotation of such flux vectors is determined by the connections of the stators. The rotors 43, 44 of the resolvers 34, 35 are rotated in a direction opposite to the direction of rotation of the flux vectors, the rotors 43, 44 being driven in the desired direction by the output shaft 45 of a motor 46.

Figure 2:
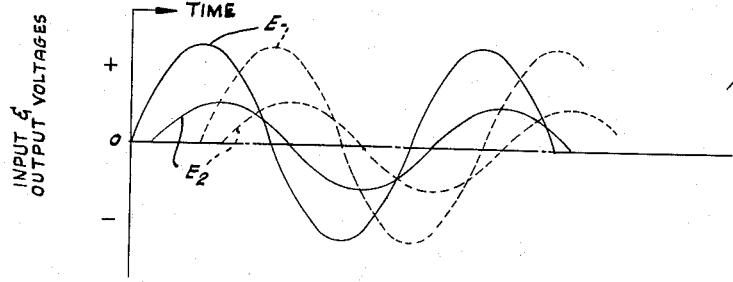
FIGURE 2 is a plot of the waveforms proportional to the input and output voltages of a network under test, such voltages being applied to the frequency adding network of FIGURE 1.
Figure 3A:
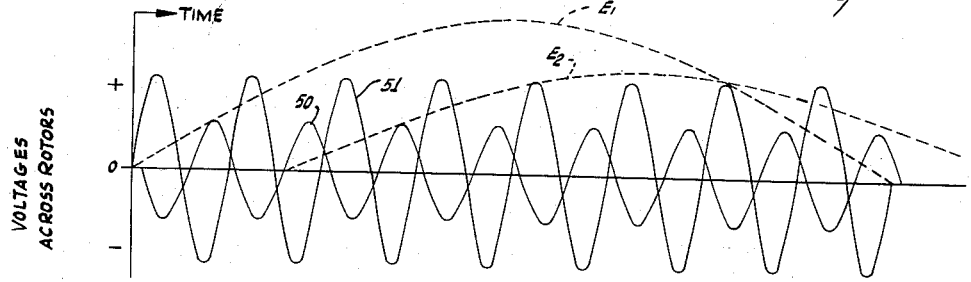
FIGURE 3a is a plot of voltages developed by the frequency adding network, such voltages containing the information in the voltages applied to the frequency adding network but being of a frequency many times greater than such input and output signals.
Figure 4:
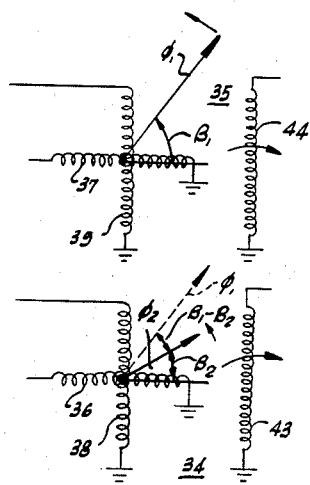
FIGURE 4 is a schematic diagram of resolvers used in frequency adding network FIGURE 1, with polar plots of flux vectors superimposed thereon to aid in explaining their operation.

Reference will be made to FIGURES 2, 3a and 4 along with FIGURE 1 in explaining the operation of the frequency adding network 11. FIGURE 2 illustrates the sinusoidal voltages $E_1$, and $E_2$ applied to the stator windings of the resolvers. The waveforms in solid lines represent the undelayed voltages applied to the stator windings 38, 39, and the dotted waveforms illustrate the shifted voltages applied to the stator windings 36, 37. As indicated in FIGURE 2, the voltage $E_1$ is shown to lead the voltage $E_2$ and to be greater in magnitude than the voltage $E_2$.

The aforementioned flux vectors are designated in FIGURE 4 as $\phi_1$ $\phi_2$, and are illustrated by polar plots superimposed on the stator windings with origins at the centres of the stator windings. The flux vector $\phi_1$ generated by the voltages $E_1$ applied across the windings 37, 39 of the resolver 35 is shown to rotate counterclockwise, and is illustrated at an arbitrary moment to be at an angle $\beta_1$ relative to the polar reference. In a similar manner, the flux vector $\phi_2$ resulting from the voltages $E_2$ apply across the stator windings 36, 38 is shown to rotate counterclockwise, and at the same instant of time is illustrated as being at an angle $\beta_2$ from the polar reference. The angle between the flux vectors $\phi_1$ and $\phi_2$, i.e., $\beta_1 - \beta_2$, remains constant and corresponds to the phase between the voltages $E_1$, $E_2$. Thus, I electrically convert from the rectangular coordinate presentation of voltages $E_1$, $E_2$ to polar representations in the form of their flux vectors $\phi_1$, $\phi_2$.

Referring to FIGURES 3a and 4, the rotors 43, 44 are rotated in the directions opposite to the flux vectors, $\phi_1$ and $\phi_2$. Such operation of the rotors has the unique result that voltages appearing across the rotors are of a frequency equal to the sum of the frequencies of the voltages $E_1$ and $E_2$ and the number of revolutions per second of the rotors. Referring to FIGURE 3a, this means that for a voltage $E_2$ of one cycle per second, and a speed of rotation of the rotor 43 of fifteen revolutions per second (i.e., 900 revolutions per minute), a voltage 50 is developed across the rotor 43 which is of the frequency of sixteen cycles per second. Similarly, a voltage 51 is developed across the rotor 44 which is of a frequency of 16 cycles per second.

It will be apparent that, if desired, the rotors may be rotated in the same direction as the flux vectors. In such case, the voltage across the rotor 44 is fourteen cycles per second.

The speed of rotation and frequencies of the voltages as above described illustrate, in conjunction with FIGURE 3a, the principle of operation of the frequency adding network 14. However, in actual practice, it is preferable to operate the motor 46 at a higher speed, e.g., 1800 r.p.m. (i.e., thirty (30) revolutions per second), in which case voltages of thirty-one (31) revolutions (cycles) per second are developed across the rotors.

In addition to the respective voltages appearing across the rotors 43, 44, being of a frequency equal to the frequencies of the voltages $E_1$, $E_2$ and the number of revolutions per second of the rotors, the voltages 50, 51 contain precisely the same information as the original voltages $E_1$, $E_2$. The ratio of the amplitude of the voltage 51 to that of the voltage 50 is precisely the same as the ratio of the amplitudes of the voltages $E_1$, $E_2$. The phase relationship between the voltages 50, 51 is the same as that between the voltages $E_1$ and $E_2$, but with one voltage 50 being inverted; this inversion is effected by merely connecting the associated resolver windings to insure such result, and is done for the purpose of facilitating the amplitude ratio and phase computations, as will be made more evident hereinafter. Thus, by converting the voltages $E_1$ and $E_2$ from their normal rectangular coordinate form to the corresponding polar representation of their flux vectors, and then through operation of the rotors as above described, again converting to a rectangular coordinate reference. I obtain output voltages which are characterized by frequencies equal to the sum of rotation speeds of the flux vectors and the corresponding rotors.

The above described frequency addition constitutes means for rejecting harmonic distortion that may be present in the signals $E_1$, $E_2$. Qualitatively, this result can be explained by considering a signal applied to one of the amplifiers 28, 29 to be comprised of the fundamental and a harmonic, e.g., the fifth harmonic, represented as $f_1$, $f_5$. By my frequency adding network, I obtain an output across the resolver rotor wherein the fundamental frequency is converted to a frequency of $f_1 + f_a$, where $f_a$ = added frequency, and the harmonic frequency is converted to $f_5 + f_a$. This destroys the harmonic relation so that any variations in the altered, or new, fundamental waveform, due to the altered harmonic, occur at different points in successive cycles of the new fundamental. Thus, harmonic distortion of the input signals $E_1$, $E_2$ appears across the rotors as random noise superimposed on the new fundamental $f_1 + f_a$. The average of such random noise is zero, so that it does not affect the accuracy of our system.

The voltages 50, 51 are applied, as at 52, 53, to respective amplifiers 55, 56. To obtain the D.-C. voltage corresponding to the amplitude ratio of the signals 50, 51, and hence corresponding to the amplitude ratio of the signals $E_1$, $E_2$, the outputs of the amplifiers 55, 56 are applied, as at 57 and 58, to respective rectifiers 59 and 60. One rectifier 59 is arranged to develop D.-C. voltages on the negative half cycles of the voltage 50, and the rectifier 60 is arranged to develop a D.-C. output on the positive half cycles of the voltage 51. These voltages are applied to respective log networks 61, 62, which are connected to respective output resistors 64, 65.

With this arrangement of the rectifiers, the voltage appearing at the junction 63 of the resistors 64, 65 is the sum of the voltages appearing in the outputs of the log networks 61, 62, and represents the logarithm of the amplitude of the voltage 51 to the amplitude of the voltage 50. This will be apparent upon consideration of the operation of the log networks. If $E_{50}$, $E_{51}$ represent the voltages 50, 51, the voltage at the junction 63 is the difference between log $E_{51}$ and log $E_{50}$, or $$\log \frac{E_{51}}{E_{50}}$$

The D.-C. voltage at the junction 63 is applied to the meter 17 to provide a meter reading of the amplitude ratio, in decibels; since the amplitude ratio of the voltages 51, 50 corresponds to the amplitude ratio of the voltages $E_1$, $E_2$, appropriate scales are placed on the face of the meter 17 so that a direct reading of the amplitude ratio of the voltages $E_1$ to $E_2$ is provided. Simultaneously, this D.-C. voltage is applicable to a recorder for making the permanent record previously mentioned.

Figure 3B:
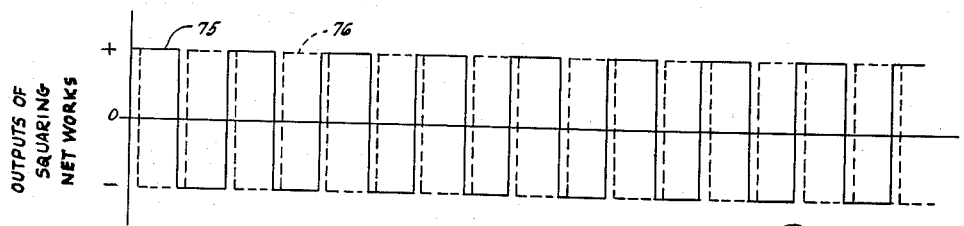
FIGURE 3b is a plot of square wave voltages developed in response to the voltages developed by the frequency adding network.

For determining the phase between the voltages $E_1$ and $E_2$, the outputs of the amplifiers 55, 56 are applied, as at 70, 71, to squaring networks 72, 73 at the input of the phase computer 16. Referring to FIGURE 3b along with FIGURE 1, the squaring networks 72, 73 develop square wave voltages in response to the voltages 50, 51, such square wave voltages being indicated at 75 and 76 in FIGURE 3b. When the voltages $E_1$, $E_2$ are 180° out of phase, the voltage 75 developed in response to the voltage 50 is in phase with the voltage 76 that is developed in response to the voltage 51. Thus, for any phase difference between the voltages $E_1$, $E_2$ other than 180°, the square wave voltage 75 is out of phase with the square wave voltage 76.

Furthermore, the squaring networks 72, 73 are arranged so that the peak amplitudes of the square wave voltages 75, 76 are the same and are reached within an extremely short period of time, e.g., within one degree of the corresponding input voltages $E_1$ and $E_2$. The significance of this arrangement will be made more apparent in the following discussion.

The outputs of the squaring networks 72, 73 are applied, as at 78, 79, to a bistable multivibrator network 80; a filter network 81 is connected between the multivibrator 80 and the meter 18. The multivibrator 80 is triggered to one conducting state by the positive going portions of the square wave 75, and is triggered to the other conducting state by the positive going portions of the other square wave 76. By making the square wave voltages 75, 76 of equal magnitude, phase shift is determined from the difference in durations of successive output voltages of opposite polarity. Thus, if the square wave voltages 75, 76 are 180 degrees out of phase, i.e., when the voltages $E_1$, $E_2$ are in phase, successive voltages of opposite polarity and equal duration and magnitude appear at the output of the multivibrator, whereupon the output of the filter network 81, which averages the voltages in the output of the multivibrator, is zero.

For any phase difference between the square wave voltages 75, 76, the voltages of opposite polarity appearing in the output of the multivibrator 80 will have different durations, the voltage of greater duration being determined by whether the voltage $E_1$ leads or lags the voltage $E_2$. Thus, the average voltage appearing in the output of the filter network 81 is of a polarity indicating whether the voltage $E_1$ leads or lags the voltage $E_2$, and of a magnitude indicating the amount of the phase difference. Accordingly, the meter movement of the meter 18 responds to the output of the filter network 81 to accurately indicate visually the phase shift between the voltages $E_1$ and $E_2$. The same voltage from the filter network 81 is applicable, as previously mentioned, for making a permanent record.

As previously mentioned, the control knob 20 is used to control the frequency of operation of the oscillator 23, and the meter 22 provides a visual indication of the frequency of operation. To effect operation of the meter 22, the potentiometer 21 is actuated by the control knob 20 to cause a D.-C. voltage to be applied to a log network 85, which in turn provides an output signal corresponding to log F, where F is the frequency of operation.

Any change in the frequency of operation of the oscillator 23 requires an adjustment of the phase shift networks 40, 41, so that the voltages $E_1$, $E_2$ will be applied to the resolvers 34, 35 in the proper polarities and phase relationships. Accordingly, I arrange the phase shifters 40, 41, the oscillator 23, and the potentiometer 21 for ganged operation so they are all adjusted simultaneously by the control knob 20.

As has been mentioned, it is necessary that the frequency of the test signal be known. However, the test signal need not come from an oscillator built-in to the frequency response analyzer. Instead, the test signal may come from any source. In such case, the control knob 20 is set so that the phase shift networks 40, 41 are tuned so that there is maximum noise rejection.

As previously indicated, my system is effective to provide indications of the transfer functions of the system or network under test in less than a cycle of the voltage used for testing. From the standpoint of frequency, it will readily be seen that this indication will show up substantially instantaneously upon positioning the control knob 20 for operation of the oscillator 23 at the desired frequency.

Regarding phase and amplitude ratio, the time required to obtain reliable readings representing the true phase and amplitude ratio relationships is predicated upon the time required for one revolution of the rotors 43, 44. Within such single revolution, my system develops D.-C. voltages, and consequent meter movements, which accurately indicate the amplitude ratio and phase shift characteristics. The significance of this is most apparent in the case of frequencies of the voltages $E_1$, $E_2$ less than the speed of the rotors. For example, when the voltages $E_1$, $E_2$ are low frequencies, such as a frequency of one-half cycle per second (i.e., a two-second period), complete amplitude and phase information is computed in less than one sixtieth of a cycle of the voltages $E_1$, $E_2$, i.e., one revolution of rotors 43 and 44 relative to the flux vectors $\phi_1$, and $\phi_2$.

While I have described one embodiment of my invention, it will be apparent that various modifications can be made therein without departing from the spirit and scope of my invention. Accordingly, I do not intend that my invention be limited, except as by the appended claims.

I claim:

1. A frequency response analyzer comprising: a pair of resolvers each having a rotor carrying a winding and a pair of stator windings arranged at right angles to each other; a respective 90° phase shift network connected to one stator winding of each resolver; means to apply a respective voltage of predetermined frequency in the vicinity of zero frequency directly to each phase shift network and to the other stator winding of the associated resolver, whereby to create a rotating flux vector of said predetermined frequency for each resolver, wherein said signals may differ in amplitude and phase; means to rotate said rotors in unison at a plurality of revolutions per second, thereby to create voltages across said rotor windings of a frequency equal to the algebraic sum of said predetermined frequency and the speed of rotation of said rotors; respective means responsive to two voltages to develop indications of their amplitude ratio and phase relationships; and means coupled to said rotor windings for applying the voltages thereacross to each of said means for developing indications.

2. A frequency response analyzer for a system characterized by operation in the vicinity of zero frequency comprising: a pair of resolvers each having a rotor with a winding thereon and a pair of stator windings arranged at right angles to each other; a respective 90° phase shift network connected to one stator winding of each resolver, said phase shift networks being adjustable; an oscillator for developing a signal of predetermined frequency in the region of zero frequency, said oscillator being adjustable in its frequency of operation; means to feed the output of the oscillator to the input of the system; respective means to couple the respective output and input voltages of the system directly to a respective phase shift network and the other stator winding of the associated resolver, whereby to create a rotating flux vector for each resolver; means to rotate said rotors in unison at a predetermined speed to create resultant voltages across said rotor windings of a frequency equal to the algebraic sum of said predetermined frequency and the speed of rotation of said rotors, the portion of the resultant frequency due to rotation of said rotors being a number of cycles per second greater than for frequencies in the vicinity of zero frequency; an amplitude ratio computer; a phase difference computer; and means coupling the voltages across both rotors to both of said computers.

3. A frequency response analyzer for any portion of an electrical system characterized by operation at A.-C. frequencies or D.-C. fluctuations near zero cycles per second, comprising: a pair of resolvers each having a rotor supporting a winding and a pair of stator windings arranged at right angles to each other; a respective 90° phase shift network connected to one stator winding of each resolver, said phase shift networks being adjustable; an oscillator for developing a signal of predetermined frequency near zero cycles per second, said oscillator being adjustable in its frequency of operation; means to feed the output of the oscillator to the input of a desired portion of the system; respective means to couple the respective output and input voltages of said portion of the system directly to a respective phase shift network and the other stator winding of the associated resolver, whereby to create a rotating flux vector for each resolver; means to rotate said rotors in unison at a predetermined speed that is relatively high compared to the speed of rotation of said flux vectors, thereby to create resultant voltages across said rotor windings of a frequency equal to the algebraic sum of said predetermined frequency and the speed of rotation of said rotors, the amplitude and phase relations of said resultant voltages being the same as the amplitude and phase of said output and input voltages; an amplitude ratio computer including respective rectifiers; a respective log network coupled to each rectifier; summing means coupled to said log networks; indicating means coupled to said summing means; a phase computer including a pair of squaring networks; a bistable multivibrator connected to both squaring networks; filter means to convert the output of said multivibrator to a D.-C. voltage; indicating means coupled to said filter means; and means to apply the voltages across said rotor windings to said amplitude ratio and phase computers so that the voltage across each rotor winding is applied both to one rectifier and one squaring network, said means operating to cause said voltages to be 180° out of phase when the output and input of the system are in phase.

4. A frequency response analyzer for any portion of a system characterized by operation near zero frequency comprising: a pair of resolvers each having a winding on a rotor and a pair of stator windings arranged at right angles to each other; a respective 90° phase shift network connected to one stator winding of each resolver, said phase shift networks being adjustable; an oscillator for developing a signal of predetermined frequency in the vicinity of zero frequency, said oscillator being adjustable in its frequency of operation; means to feed the output of the oscillator to the input of a desired portion of the system; respective means to couple the respective output and input voltages of such portion directly to a respective phase shift network and the other stator winding of the associated resolver, whereby to create a rotating flux vector for each resolver; means to rotate said rotors in unison at a plurality of revolutions per second in a direction opposite to the direction of rotation of said flux vectors, thereby to create voltages across said rotor windings of a frequency equal to the sum of said predetermined frequency and the speed of rotation of said rotors, the speed of rotation of said flux vectors being a fraction of that of said rotors; an amplitude ratio computer including respective rectifiers; a respective log network coupled to each rectifier; summing means coupled to said log networks; indicating means coupled to said summing means; a phase computer including a pair of squaring networks; a bistable multivibrator connected to both squaring networks; filter means connected to said multivibrator; indicating means coupled to said filter means; means to apply the voltages across said rotor windings to said amplitude ratio and phase computers so that the voltage across each rotor winding is applied both to one rectifier and one squaring network, said means operating to cause said voltages to be 180° out of phase when the output and input of the system are in phase; means to develop a D.-C. voltage corresponding to the frequency of operation of said oscillator; a log network coupled to said D.-C. voltage developing means; indicating means coupled to said last mentioned log network; and means for simultaneously adjusting said D.-C. voltage developing means, said oscillator and said phase shift networks for optimum operation at each oscillator frequency, whereby to provide information simultaneously of a plurality of transfer functions of the portion of the system.

5. In a frequency response analyzer, the combination of: a pair of resolvers each having a rotor carrying a winding and a pair of stator windings arranged at right angles to each other; a respective 90° phase shift network connected to one stator winding of each resolver; means to apply a respective voltage of predetermined frequency in the vicinity of zero frequency directly to each phase shift network and to the other stator winding of the associated resolver, whereby to create a rotating flux vector of said predetermined frequency for each resolver, wherein said signals may differ in amplitude and phase; means to rotate said rotors in unison at a speed to create resultant voltages across said rotor windings of a frequency equal to the algebraic sum of said predetermined frequency and the speed of rotation of said rotors, said rotor windings being connected to said phase shift networks and signal applying means so that the resultant voltages developed across said rotor windings are respectively inverted and uninverted relative to the applied voltages, the number of revolutions per second of said rotors being greater than the number of cycles per second of a frequency in the vicinity of zero frequency; respective means responsive to two voltages to develop indications of their amplitude ratio and phase relationships; and means coupled to said rotor windings for applying the voltages thereacross to each of said means for developing indications.

References Cited in the file of this patent

UNITED STATES PATENTS

| | | |
|---|---|---|
| 2,576,249 | Barney | Nov. 27, 1951 |
| 2,580,803 | Logan | Jan. 1, 1952 |
| 2,632,792 | Selz | Mar. 24, 1953 |
| 2,685,063 | Alsberg | July 27, 1954 |
| 2,806,295 | Ball | Sept. 17, 1957 |

FOREIGN PATENTS

| | | |
|---|---|---|
| 565,266 | Great Britain | Nov. 2, 1944 |